May 21, 1935. J. T. WORTHINGTON 2,001,809
METHOD AND APPARATUS FOR SETTLING
Filed April 19, 1932

INVENTOR:
JOHN T. WORTHINGTON,
By

ATTORNEY.

Patented May 21, 1935

2,001,809

UNITED STATES PATENT OFFICE 2,001,809

METHOD AND APPARATUS FOR SETTLING

John T. Worthington, Long Beach, Calif., assignor to Petroleum Rectifying Company of California, Los Angeles, Calif., a corporation of California Application April 19, 1932, Serial No. 606,129

13 Claims. (Cl. 204—24)

My invention relates to separating devices, and more particularly to a separating device which finds particular utility in an electric dehydrator.

Crude petroleum often carries dispersed water particles to such an extent as to be commercially objectionable. Several methods of separating this undesirable water are at present known, one method being to subject the emulsion to the action of an electric field whereby the dispersed water particles are agglomerated into masses of sufficient size to gravitate from the oil.

This separation of the water and oil will not take place, however, at a definite section, for if the treated emulsion is moved into a settling space and allowed to settle therein, it will be found that the bodies of water and oil are spaced from each other by a body of loose emulsion. This loose emulsion is composed primarily of water in rather large globules, but these globules remain intact for a considerable period of time due to the oil present in the loose emulsion, this oil apparently forming a membrane or skin of oil around each globule of water. This membrane is quite delicate and will of itself break when the emulsion is allowed to stand for a long period of time.

It is an object of this invention to provide an apparatus and method for rupturing such delicate membranes of oil around the water particles of a loose emulsion, thereby increasing the rate of settling.

A further object of the invention is to provide a novel agitating apparatus for use in this and other connections.

The device may be installed directly in a conventional dehydrating apparatus, and in this event I have found it desirable to have the agitating means not only function to assist settling of the loose emulsion, but in addition to introduce or distribute the incoming emulsion with respect to the liquid in the tank. By this means a preliminary washing is obtained. The incoming emulsion often carries colloidal matter which appears to detrimentally affect the operation of the treater and it has been found that this colloidal matter is removed from the emulsion by the preliminary washing step and drops to the lower portion of the tank without being carried upward into the electric field. The slight agitating action tends to equally distribute and effectively wash this incoming emulsion.

It is another object of the invention to provide an improved electric treater in which an agitating action is set up in the lower portion of the treater tank and in which the incoming emulsion is discharged into the zone where agitation takes place.

Further objects and advantages of the invention will be made evident hereinafter.

Referring to the drawing—

Figure 1:
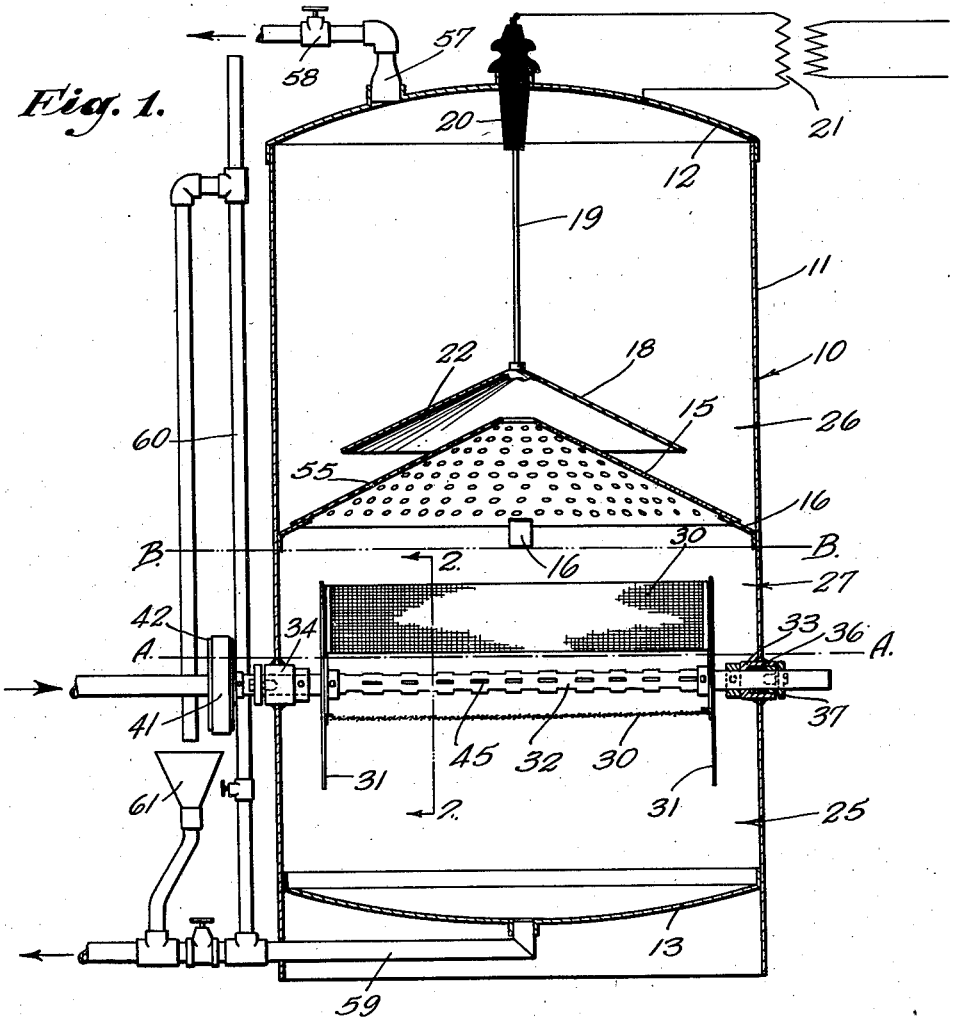
Fig. 1 is a vertical sectional view of one form of dehydrator including the novel agitating means of the invention.

The dehydrator is shown as comprising a tank 10 providing a shell 11 closed respectively at its upper and lower ends by heads 12 and 13.

An electrode means is provided in the upper portion of the tank and is shown as comprising a perforated grounded electrode 15 of conical form mounted on brackets 16 so as to be spaced from the shell 11. This electrode means also includes a live electrode 18, also conical in shape, suspended from a rod 19 extending through an insulator 20. A transformer or other supply means 21 builds up an electric field in a treating space 22 formed between the electrodes 15 and 18.

The action of such an electrical field on a petroleum emulsion is well known. The water particles of this emulsion agglomerate into larger droplets, this action continuing until the large water droplets settle in the tank 10. Separation of the oil and water does not, however, take place at a definite interface. Instead, after the treater has been operated for a time it will be found that the lower end of the tank contains a body of water indicated by the numeral 25, while the upper end of the tank contains a body of dry oil indicated by the numeral 26. Between these bodies of water and oil is a body of loose emulsion indicated by the numeral 27. The upper portion of this body of loose emulsion is drier than the lower portion, but is separated from the body of dry oil at a more or less definite interface indicated by the line B—B of Fig. 1. Similarly, the body of loose emulsion and the body of water normally separate at a more or less definite interface indicated by the line A—A of Fig. 1.

This body of loose emulsion indicated by the numeral 27 is composed in the main of rather large water globules, these globules being retarded from further agglomerating and settling due to the presence of films of oil therearound and forming membranes which prevents fast settling. These membranes are usually quite delicate and such a loose emulsion will separate if sufficient time is allowed for this action to take place.

The rate at which dehydration will be effected in the tank 10 is dependent almost entirely upon the rate of separation. This rate of separation is very much impeded by the presence of this body of loose emulsion indicated by the numeral 27. I have found that by gently agitating this loose emulsion the delicate membranes can be disrupted and that the water will almost immediately separate and move into the body of water in the lower portion of the tank 10.

Figure 2:
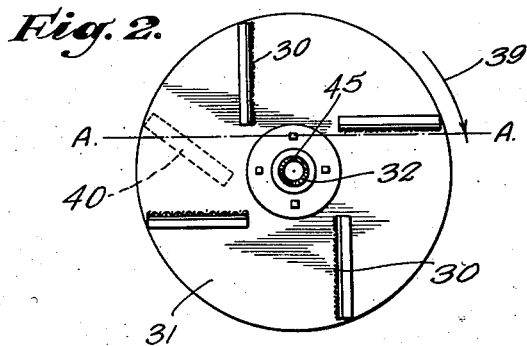
Fig. 2 is a sectional view taken on the line 2—2 of Fig. 1.

This result may be accomplished by the use of various agitating means, but the preferred form is illustrated in Fig. 1 as comprising a plurality of paddles 30 extending between two discs 31 which are in turn mounted on a rotatable member 32. This rotatable member is shown as being journalled in bearings 33 and 34 secured to the shell 11, the junction of this rotatable member and each bearing being sealed by a packing or other sealing means indicated by the numeral 36, this packing means being compressed by a gland 37 in a well known manner. The paddles 30 are preferably disposed non-radially with respect to the axis of the rotatable member 32. In the preferred form I utilize a plurality of paddles disposed around the rotatable member 32 in such positions as to be tangential with respect to a circle concentric with the rotatable member 32. If the radius of this circle is made substantially equal to the distance between the axis of the rotatable member 32 and the section A—A, it will be clear that the paddles will extend horizontally at the time that they pass into the body of water below the level A—A. In other words, if the rotatable member 32 is rotated in a direction indicated by the arrow 39 of Fig. 2, the paddles will be moving downward through the section A—A in a position which is substantially parallel to this section. When, however, these paddles move upward from the body of water into the body of loose emulsion indicated by the numeral 27, they will be in an inclined position indicated by dotted lines 40 of Fig. 2. These paddles are preferably made of screen and it will thus be clear that as any particular paddle moves into the body of water below the section A—A, it is parallel to this section and assists in forcing any water particles downward into the body of oil. When, however, the screen paddle is moving from the body of water it assumes an inclined position with respect to the section A—A and does not tend to re-mix water particles from the body of water into the body of loose emulsion. This action is very desirable.

The rotatable member 32 is slowly rotated by any suitable means such as a belt 41 positioned on a pulley 42 and driven by any suitable drive means. The action of the interstitial paddles in moving through the body of loose emulsion is to mechanically disrupt the oil films which surround the rather large water masses. It is desirable to rotate the agitating means only very slowly so that there is no tendency to emulsify the water and oil present in the zone between the sections A—A and B—B. The speed of rotation need be only a few revolutions per minute in order to obtain these desirable results and a severe agitating action should be avoided.

Various well known devices may be utilized for introducing the incoming emulsion into the treater. In the preferred embodiment, however, I utilize the agitating means for this purpose, thus securing additional advantages. In this connection, the rotatable member 32 is preferably in the form of a perforated pipe, slots 45 being cut therein so as to discharge the emulsion at a section within the body of water in the lower portion of the treater tank. Any suitable means, not shown, may be utilized for introducing the emulsion under pressure into the rotating member 32.

As this emulsion is discharged through the slots 45, it is washed by the water immediately therearound, this washing step removing certain colloidal matter and other undesirable substances which drop to the bottom of the tank 10. This washing is assisted by the action of the interstitial paddles 30. The washed emulsion is moved upward in the tank 10 and through the openings 55 formed through the grounded electrode 15, thus entering the treating space 22 wherein agglomeration of the water particles takes place, as previously set forth. The phases of the emulsion are then separated due to the action previously described.

The tank 10 is preferably completely filled with liquid during the operation of the treater, this being permitted by withdrawing the separated constituents from the tank at a rate corresponding to the amount of emulsion introduced through the rotating member 32. In this connection, the dry oil is withdrawn through a pipe 57 including a valve 58, while the water and other settings are withdrawn through a pipe 59. The usual stand-pipe 60 may be utilized, the water flowing into a funnel 61 so that the water discharged from the treater may be observed.

It should be understood that I am not limited to the particular emulsion introduction system disclosed. Further, while the particular type of agitating means has been found to be very effective, other agitating means can be substituted and fall within the scope of this invention.

I claim as my invention:

1. A method of separating the constituents of a petroleum mixture, which method includes the steps of: settling said mixture to form bodies of oil and water with a body of loose emulsion therebetween; and mechanically selectively agitating said body of loose emulsion and said body of water without material agitation of said body of oil.

2. A method of separating the constituents of a petroleum emulsion, which method includes the steps of: electrically treating said emulsion to agglomerate the dispersed phase thereof; allowing the treated emulsion to settle in a zone below the zone of electric treatment to form bodies of oil and water separated by a body of loose emulsion; gently agitating said loose emulsion; introducing emulsion to be treated into the zone of agitation of said loose emulsion; and moving said emulsion to be treated upward to said treating zone.

3. In combination: a tank in which a petroleum mixture may gravitationally separate into bodies of oil and water separated by a body of loose emulsion, said tank containing such bodies of water and oil separated by a body of loose emulsion; a movable agitation means extending into said body of loose emulsion for gently agitating the same to facilitate settling of the constituents thereof, said agitation means also extending into said body of water but being spaced from said body of oil; and drive means for driving said agitation means during the settling of said petroleum mixture.

4. A combination as defined in claim 3 in which said agitation means includes paddles spaced from said body of oil but positioned to move into and from said bodies of loose emulsion and water, and in which said drive means slowly moves said paddles from said body of loose emulsion into said body of water whereby the water in said loose emulsion is separated and moved downward into said body of water.

5. In combination: a tank in which a petroleum mixture may gravitationally separate into bodies of oil and water separated by a body of loose emulsion, said tank containing such bodies of oil and water separated by a body of loose emulsion; a plurality of interstitial paddles positioned below said body of oil and movable from said body of loose emulsion into said body of water; and drive means for said paddles.

6. In combination: a tank in which a petroleum mixture may gravitationally separate into bodies of oil and water separated by a body of loose emulsion, said tank containing such bodies of oil and water separated by a body of loose emulsion; a rotatable member extending horizontally in said tank at a level adjacent the interface between said loose emulsion and said water; paddle means mounted on said rotatable member and extending into said loose emulsion when said rotatable member is in one position and extending into said body of water when said rotatable member is in another position but substantially removed from said body of oil at all times; and drive means for rotating said rotatable member.

7. A combination as defined in claim 6 in which said paddle means comprises a plurality of intestitial paddles disposed around said rotatable member in positions tangential to a circle drawn around said rotatable member.

8. In combination in an electric dehydrator: a tank containing bodies of oil and water separated by a body of loose emulsion; electrode means disposed in the upper portion of said tank; agitating means below said electrode means and extending both into said body of loose emulsion and into said body of water; and emulsion introduction means communicating directly with said agitating means, said agitating means distributing the incoming emulsion which then rises through said loose emulsion to said electrode means due to the lower density of said emulsion as compared to said loose emulsion.

9. In combination in an electric dehydrator: a tank containing bodies of oil and water separated by a body of loose emulsion; electrode means disposed in the upper portion of said tank; a perforated pipe extending horizontally in said tank at a level adjacent the interface between said loose emulsion and said water; paddle means mounted on said perforated pipe and moving through both said body of loose emulsion and said body of water when said perforated pipe is rotated; means for supplying emulsion to be treated to said perforated pipe, whereby the emulsion to be treated is washed and moved upward into the zone of said electrode means; and drive means for said perforated pipe.

10. In combination: a tank containing gravitationally separating bodies of oil and water separated by a body of loose emulsion; an interstitial paddle in said tank; and means for moving said interstitial paddle downward from said body of loose emulsion into said body of water while in a position substantially in the plane of the interface between the loose emulsion and the water, and for returning said paddle to said body of loose emulsion while in a plane inclined to said interface to facilitate separation of the water in said loose emulsion.

11. In combination: a tank containing gravitationally separating bodies of oil and water separated by a body of loose emulsion; a rotatable member extending substantially horizontally in said tank at a section near the interface between said body of loose emulsion and said body of water; a pair of discs mounted on said rotatable member and spaced from each other; an interstitial member extending between said discs and movable from said body of loose emulsion into said body of water when said rotatable member is turned; and means for turning said rotatable member.

12. A combination as defined in claim 11 in which said interstitial member extends in a non-radial plane with respect to the axis of rotation of said rotatable member.

13. In combination: a tank containing gravitationally separating bodies of oil and water separated by a body of loose emulsion; a perforated rotatable member extending substantially horizontally in said tank at a section near the interface between said body of loose emulsion and said body of water; a plurality of interstitial paddles attached to said perforated rotatable member and movable through the interface between said body of loose emulsion and said body of water as said rotatable member is moved; means for turning said perforated rotatable member; and means for delivering emusion to said perforated rotatable member during the turning thereof.

JOHN T. WORTHINGTON.